Jan. 8, 1963 T. M. JONES ETAL 3,072,239
STERILISING OR PRESERVING APPARATUS
Filed Aug. 13, 1959 3 Sheets-Sheet 1

Inventors
T. M. Jones
L. E. Robinson
By Mascot Downing Seebold
Attys.

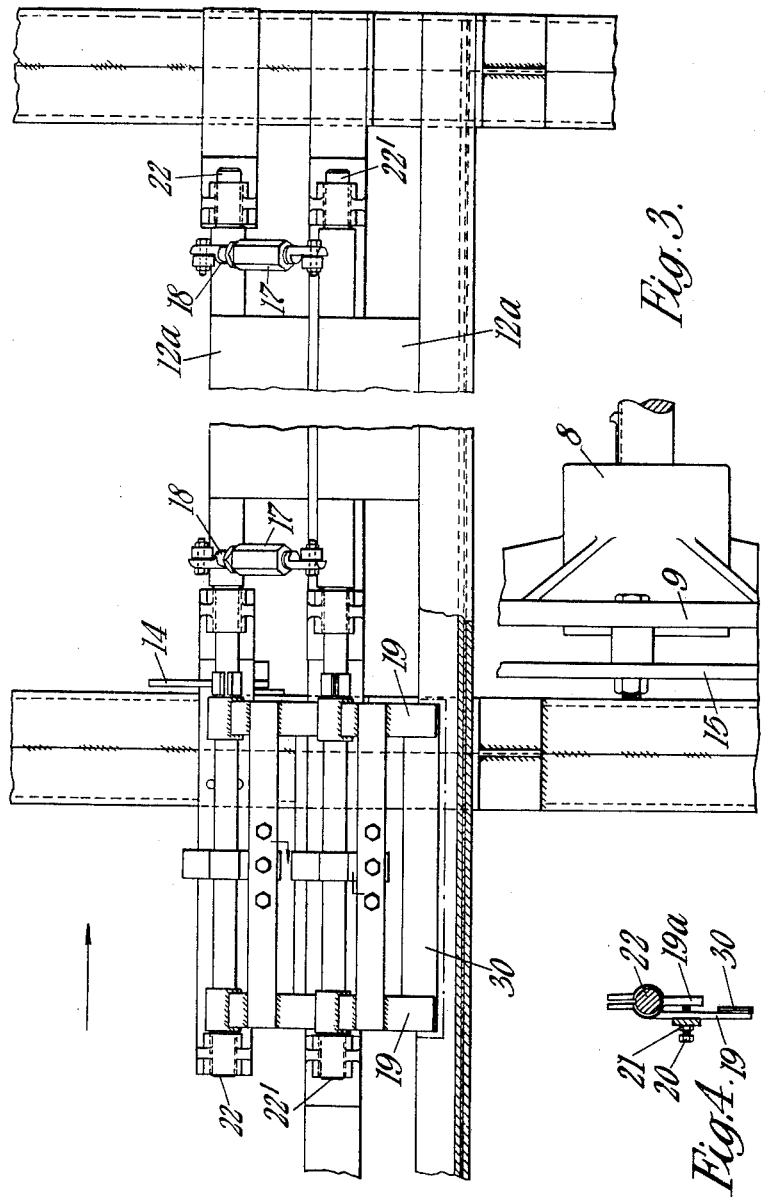

United States Patent Office 3,072,239
Patented Jan. 8, 1963

3,072,239
STERILISING OR PRESERVING APPARATUS
Thomas Marsden Jones, Hove, and Leslie Ernest Robinson, London, England, assignors to Mitchell Engineering Limited, London, England
Filed Aug. 13, 1959, Ser. No. 833,513
17 Claims. (Cl. 198—24)

This invention relates to sterilising, preserving or like apparatus and more particularly to sterilising or preserving apparatus of the continuous processing type in which the articles containing the materials to be processed are carried through the apparatus by some form of conveyor mechanism so that they are subjected to the required heat treatment for a predetermined time.

The invention is particularly applicable to a sterilising and preserving apparatus of the kind described in United States Patent No. 2,893,536 in which the conveyor mechanism comprises a plurality of links or sections which form part of a flexible conveyor and are adapted to accommodate the articles between them during their passage through the apparatus, such links or sections being so constructed and arranged as to provide spaces or openings between the outer parts of adjacent links or sections for effecting the admission or discharge of the articles.

The present invention has for its main object to provide an improved method of effecting the admission and discharge of the articles so as to improve the economic output of the apparatus and the invention accordingly consists in a sterilising and preserving apparatus of the kind referred to, in the preceding paragraph wherein means are provided whereby rows of articles may be introduced and/or discharged, at a plurality of different positions in the conveyor whereby articles from different feed sources may be accommodated in the conveyor at the same time.

According to the preferred arrangement, the conveyor mechanism comprises a plurality of carrier bars of approximately I-section mounted parallel to one another between endless chains or belts adapted to convey the bars through the sterilising or preserving apparatus and means are provided for effecting the admission of a plurality of rows of articles on to a plurality of different carrier bars and for effecting the selective discharge of such rows of articles after processing, whereby rows of articles from different feed sources may be processed simultaneously and automatically segregated on discharge.

Preferably a plurality of feed conveyors are provided for delivering articles into a plurality of rows opposite said carrier bars and means are provided which are operatively associated with the conveyor in such a way as to effect the operation of actuating means for propelling said rows of articles simultaneously on to successive carrier bars, similar cam means also being provided for releasing said rows of articles from the conveyor and discharging them on to a plurality of discharge conveyors or other collecting devices. If desired, the feed and discharge conveyors may be provided with one or more common conveyor belts.

The invention will be more completely understood from the following detailed description which is given in conjunction with the accompanying drawings, in which:

FIGURES 2 and 3 are sectional end and front views respectively of one form of loading mechanism;

FIGURE 4 is a cross sectional view of the brake arm and its shaft as used in the loading mechanism shown in FIGURES 2 and 3.

Figure 1:
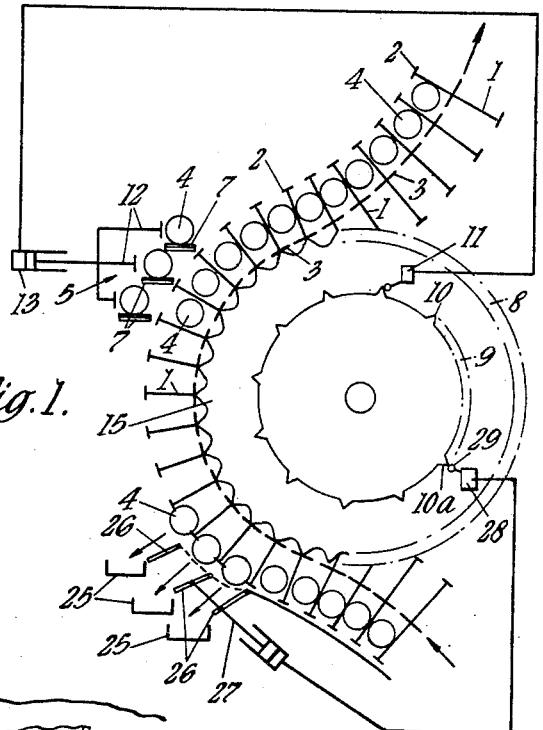
FIGURE 1 is a diagrammatic view of part of a sterilising or preserving apparatus together with a loading and discharge mechanism constructed in accordance with the invention.

Referring now to these drawings, the sterilising or preserving apparatus is constructed in the form of an upright housing provided with a suitable heating and cooling arrangement and within which a conveyor mechanism for the articles to be processed is arranged to pass. This conveyor mechanism is constructed in the form of a plurality of bars 1 each formed as an I-section having a central cross flange which are conveniently formed from extruded aluminium and so shaped that the outer flanged ends 2 of each section are different in width from the central flange, an outer flange 2 being narrower than the central flange 3. These bars 1 are arranged parallel to one another, their opposite ends being mounted upon two endless chains which are disposed parallel to one another in such a way that the adjacent wider flanges of the bars are separated by a small space, each pair of links in the two chains thus carrying one bar. By means of this arrangement, a narrow chamber or housing is formed between each successive pair of bars which are so arranged as to accommodate a row of articles such as cylindrical cans 4 lying on their sides.

These housings are partially enclosed by the outer flanges 2 of the bars 1 which serve to hold the cans 4 in place during the time that they are in the conveyor and means are provided for opening each housing as it faces the loading position in order to permit the cans to enter the conveyor. Conveniently, in order that this may be effected, the chains are so arranged as to cause the conveyor to follow a curved path opposite the feeding position 5 so as to cause the adjacent bars 1 to swing apart from one another thereby causing the outer narrow flanges 2 of each succeeding pair of bars to open sufficiently to permit a row of cans 4 to fall into the accommodating space between the bars which automatically swing together again as the conveyor moves out of the curved path thus causing the cans to be securely housed in position in the conveyor which is driven by an electric motor or other suitable means so as to travel slowly through the sterilising or preserving apparatus at a predetermined speed, the conveyor reaching the aforesaid curved path again on emerging from the apparatus so as to swing the bars open again opposite the discharge position 6 and allow the cans to be discharged.

For the purpose of feeding the cans into the conveyor, a set of loading conveyors 7 are provided which are constructed in shallow channel like form so as to be capable of accommodating rows of cans lying on their sides and these channels are disposed one above the other in staggered formation so as to lie opposite carrier bars 1 in the main conveyor at the loading position. An idler sprocket 8 is provided for causing the conveyor to move in this manner and in order that the rows of cans may be pushed out of the loading channels 7 into the conveyor, a cam or control wheel 9 is bolted on to the face of the idler sprocket 8, this cam or control wheel having a set of equi-spaced radial projections 10 which are adapted to engage with the valve 11 of a pneumatic or hydraulic system controlling a set of push bars 12 associated with the loading channels 7 so that each time one of these projections 10 engages with the aforesaid valve 11, these push bars 12 are actuated by the hydraulic ram 13 so as to push the rows of cans 4 out of the loading channels 7 into the corresponding carrier bars 1 of the conveyor. Conveniently the speed of the cam or control wheel 9 is synchronised with the mechanism provided for feeding the cans 4 into the loading channels 7 and the projections 10 are spaced apart according to the number of loading channels employed so that as the conveyor moves round it is completely loaded with rows of cans from the loading channels which are emptied simultaneously each time the cam or control wheel operates the actuating valve. Thus by means of this arrangement, rows of cans from different preparation lines may be introduced simultaneously into the conveyor and by synchronising the movements of the feed conveyor and the cam wheel 10 controlling the loading mechanism, the loading is able to proceed automatically with the conveyor working at full capacity.

A brake mechanism of any suitable form is provided for retaining the cans in the loading channels until the moment comes to discharge them into the conveyor, and this brake mechanism is operatively interconnected with the mechanism controlling the aforesaid push bars. A suitable form of brake mechanism will be described hereinafter.

In order to discharge the cans from the conveyor at the end of the processing in the same order in which they were introduced, a plurality of discharge conveyors 25 are provided at the position where the cans are to be discharged from the main conveyor and these discharge conveyors which are constructed in shallow channel like form for receiving the rows of cans 4, are disposed one above the other in staggered formation, the number of discharge conveyors being the same as the number of feed conveyors 7. If desired, these discharge conveyors 25 may be integral with the feed conveyors, and so arranged as to use a common belt and motor. They are disposed immediately opposite the point where the main conveyor begins to swing open as seen in FIGURE 1, but the openings so formed are normally blocked by a set of pivoted traps 26 which retain the rows of cans in the main conveyor until the moment when they are exactly opposite the discharge conveyors when they are automatically swung open so as to allow the cans to roll out of the main conveyor into the discharge conveyors, these traps then serving as guide or bridge members for the cans as they pass from one conveyor to the other. These traps are controlled by an arrangement of push bars 27 which are adapted to be actuated pneumatically or hydraulically from a discharge valve 28 which is also so positioned as to be operated by the projections 10 on the cam or control wheel 9 so that the traps 26 are opened simultaneously at the appropriate moment and allow the rows of cans to fall into the set of discharge conveyors 25 ready to receive them.

In order to set the discharge mechanism, the main conveyor should be slowly turned over until the the leading row of cans 4 is just leaving the trap 26 which should be in the closed position. The operating mechanism actuated by the control wheel 9 now begins to operate, therefore the flank of the cam tooth 10a must be in a position ready to strike the roller 29 on the lever controlling the valve 28. The roller should have been previously set with the trap closed to form a straight line with its spindle and the centre of the control wheel. As the cam advances the trap 26 will open until the row of cans 4 to be discharged has rolled down the face of the trap into the discharge belt 25. At this stage the roller 29 passes over the crest of the tooth 10a and the trap 26 closes until another leading row of cans has passed it.

To ensure that the trap returns to the position a pair of adjustable stops are located at each end of the trap spindle 26.

The sequence of operation of the mechanism is accordingly as follows:

The containers 4 are fed onto the endless feed conveyor belt 40, which moves the cans along the loading channel until they are arrested by the can stop 41.

At a signal from an adjustable cam attached to the main conveyor a pneumatic circuit comes into play which operates the brake mechanism 42. This stops any further flow of cans across the face of the machine.

A delay, built into the pneumatic system ensures that the last can leaving the brake is completely contained in the feeding section, whereupon the hydraulic rams 13 are operated to feed the stick of cans in the feed conveyor into the main conveyor.

An adjustable cam then releases the pneumatic circuit, whereupon the brake releases and the push bar returns to the open position.

The cycle is then repeated, the discharge mechanism being so arranged as to tip the stick of cans from the main conveyor into the discharge belt.

It will thus be seen that by means of this arrangement, rows of cans from different preparation lines can be continuously loaded into the same conveyor and processed simultaneously and that when the processing is complete, they are automatically discharged in the same order in which they were fed to the steriliser and that in consequence it is possible by means of the invention to process different varieties of product if necessary in cans of different sizes in the same machine and to keep each variety and can size segregated from the others, the products being discharged on to individual conveyor lines in the same order in which they were introduced into the machine and sent away for labelling and packing without requiring further sorting.

Figure 2:
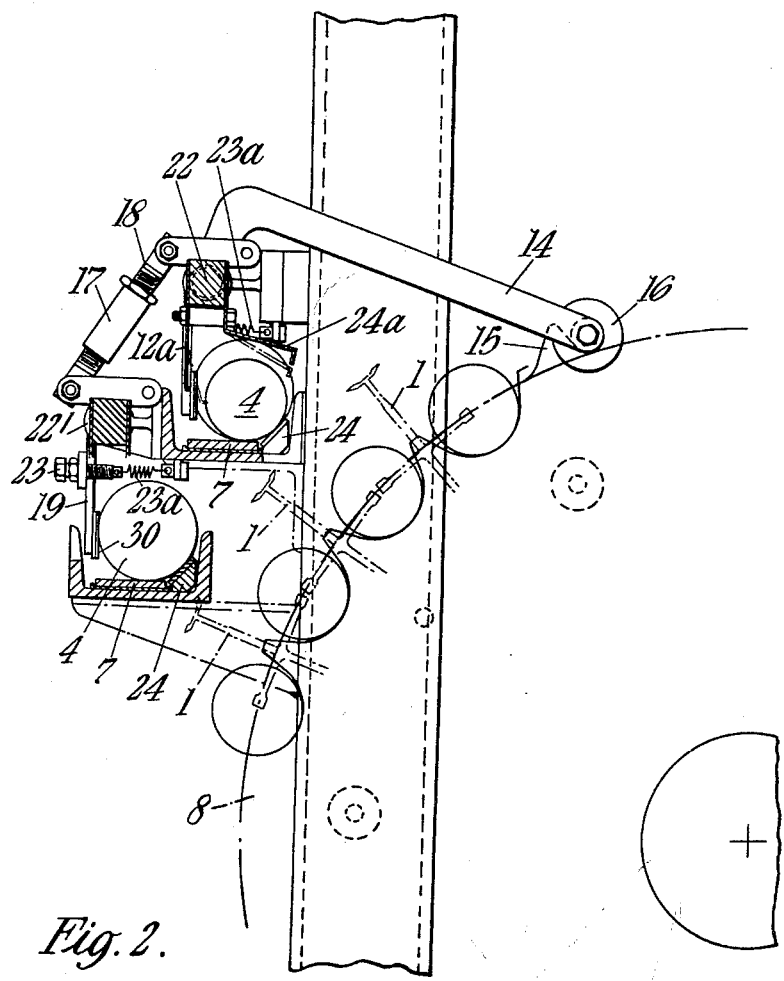

An alternative means of introducing sticks of cans into the carrier bars is shown in FIGURES 2, 3 and 4. A lever 14 carries a roller 16 for actuation by the cam plate 15, and is secured to a shaft 22. The cam plate 15 is attached to the roller sprocket 8 of the main conveyor by bolts which extend through slots in the plate 15 so that when the bolts slackened off the cam plate can be rotated relatively to the sprocket. This provides a means for timing the mechanism. A pusher bar or plate 12a is secured to the shaft 22 and is arranged so that when the arm 14 is raised by the cam 15 the shaft 22 is rotated anti-clockwise and the pusher bar 12a is swung by the said shaft to the right as seen in FIGURE 2 so as to push a row of cans off the conveyor 7 and deposit them between the conveyor bars 1. It is to be noted that the inner side of the conveyor channel is omitted over a distance corresponding to the length of a row of cans. The upper shaft 22 is connected by a link 17, 18 to a second and lower shaft 22' (see also FIGURE 3) associated with the lower conveyor 7 and carrying a similar pusher bar 12a. The link part 17 is an adjustable threaded sleeve which enables the operation of the two pusher bars 12a to be synchronised. Thus a row of cans is delivered from each of the conveyors 7 to the conveyor bars 1 substantially simultaneously.

It will be understood that the cans are being advanced in line along the two conveyors, and it is necessary to stop the travel of the following cans while the row of cans is displaced laterally by the pusher bars. A brake mechanism is provided for this purpose and comprising sets of brake arms 19 rotatable on the respective shafts 22 and 22' and connected by brake strips 30 as seen in FIGURES 2, 3 and 4. These brake arms are loaded through adjusting screws 23 by springs 23a which hold the arms against stops 19a secured to the respective shafts 22 and 22' (FIGURE 4). Adjusting screws 20 with lock nuts 21 bear on the stops 19a and determine the relation between the brake arms and the said stops 19a and hence determine the relation between the brake arms and the pusher bars 12a. Also the conveyor channels are provided in the braking region with back brake blocks 24, and holding members 24a as shown in FIGURE 2 are attached to the shafts 22, 22'. The arrangement is such that operation of the lever 14 to actuate the push bars 12a for delivering a row of cans releases the stops 19a holding the brake arms 19 and allows the said brake arms to be drawn by their springs into engagement with the following cans so that these cans are prevented from advancing while the delivery of the foremost row of cans is effected.

Synchronisation is effected by turning the main conveyor over slowly until a pair of carrier bars 1 are in a position relative to the feed channels where it can be seen that a row of cans will enter freely without fouling. Adjustment of the cam plate 15 can be made, as described previously, until the roller 16 is riding on the crest of a tooth and the push bars 12a are in the fully forward position. After locking the cam plate 15 into position, the conveyor should again be turned over slowly and the push bars will then operate as every second carrier bar passes in the relative positions previously set.

Figure 5:
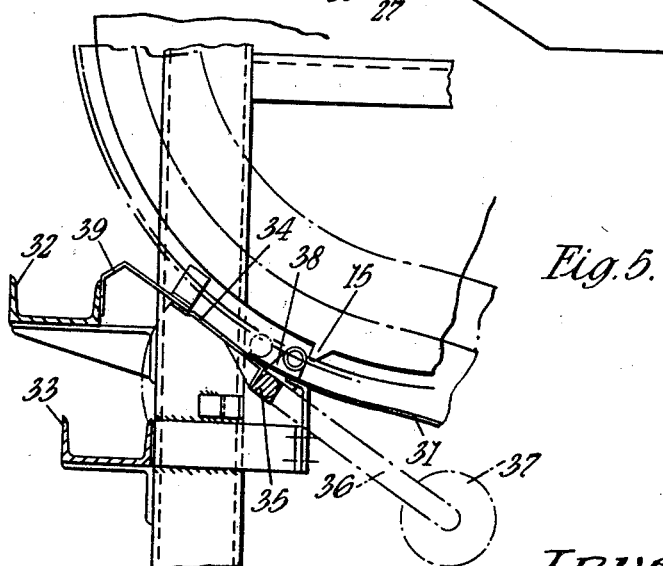
FIGURE 5 is a sectional end view of one form of discharge mechanism.

Discharge of the rows of cans is effected by the mechanism shown in FIGURE 5. The rows of cans advanced by the main conveyor (not shown) travel along a curved plate 31 leading to an upper delivery conveyor 32. A lower delivery conveyor is shown at 33. A trap 34 is secured to a pivotal shaft 35 to which is secured a lever 36 carrying a weight 37. An arm 38 also secured to the shaft 35 is arranged to be actuated by the cam wheel 15 previously described. The arrangement is such that when the trap 34 is closed as shown, a row of cans will be discharged into the upper conveyor 32 over the guide plate 39. As the next row of cans approaches the trap, the latter is swung downwardly by cam actuation of the arm 38 so as to constitute a downwardly directed guide leading to the lower conveyor 33 to which the row of cans is delivered. Thus alternate rows of cans are delivered to the upper and lower conveyors respectively. The arrangement may be modified by the provision of a further trap or traps to deliver succeeding rows of cans to three or more conveyors.

It will be understood that the invention is not limited to the arrangements described which are given by way of example and may be modified to suit individual requirements. Thus electrical means may be employed to control the introduction and discharge of cans. Also various means may be provided for timing adjustment so as to ensure that rows of cans will be introduced and discharged at appropriate times without fouling the machine or becoming jammed and that the push bars may be detachably mounted so that they may be suitably interchanged when feeding cans of different sizes.

It is also to be understood that the main conveyor may be constructed in double form as described in U.S. Patent No. 2,893,536 in which case the feed and discharge arrangements may be duplicated so as to operate on both sides of the conveyor and thus enable the capacity of the machine to be doubled.

It is also to be understood that while the invention is particularly applicable to a conveyor of the kind described in U.S. Patent No. 2,893,536, it is not to be regarded as being in any way limited to a conveyor of this type, since it is readily applicable to any of the other types of conveyors which are or may be used in sterilising or preserving equipment.

We claim:

1. In a sterilising or preserving apparatus including a processing chamber and having a plurality of infeed and of outfeed conveyors to convey articles to and from said chamber, a conveying means having recesses formed to receive therealong successive rows of said articles containing material to be processed for passage through said chamber, said plurality of conveyors being located adjacent successive recesses of said conveying means and positioned to be parallel to said recesses, said conveyors being positioned so that an article on each said infeed conveyor will be aligned with an article on the adjacent infeed conveyors adjacent said conveying means to form a row of said articles, and means for simultaneously effecting simultaneous displacement of said rows of articles, in a direction transverse to the length of each row, between said conveyors and said conveying means.

2. Apparatus according to claim 1, in which the means for effecting displacement of said rows of articles is arranged to load such rows upon said conveying means.

3. Apparatus according to claim 1, in which the means for effecting displacement of said rows of articles is arranged to discharge such rows from said conveying means.

4. Apparatus according to claim 1, in which the conveying means is an endless conveyor, and a plurality of feeding means are located respectively at loading and discharge regions adjacent said conveying means, and in which said conveyors provide for loading a plurality of rows of articles from different sources of articles onto the conveying means simultaneously and in a predetermined arrangement, and for discharging said plurality of rows of articles from the conveying means onto the same number of conveyors at said discharge region and in the same predetermined arrangement.

5. Apparatus according to claim 1, including cam means operatively associated with the conveying means for controlling operation of the means for effecting displacement of the rows of articles to and from said conveying means and said conveyors.

6. Apparatus according to claim 1, including cam means operatively associated with the conveying means, and actuating means controlled by said cam means for propelling rows of articles from the conveyors to the conveying means.

7. Apparatus according to claim 1, including cam means operatively associated with the conveying means, actuating means for propelling rows of articles from the conveyors to the conveying means, and fluid pressure means controlled by said cam means for operating said actuating means.

8. Apparatus according to claim 1, in which the conveying means is a link conveyor, including a sprocket wheel driven by the conveying means, a toothed wheel rigidly connected to said sprocket wheel, push rods for effecting displacement of rows of articles from the conveyors to the conveying means, fluid pressure means for actuating said push rods, and a control valve periodically actuated by said toothed wheel for causing actuation of said fluid pressure means to load the rows of articles upon the conveying means.

9. Apparatus according to claim 1, in which the conveying means is a link conveyor, including a sprocket wheel driven by the conveying means, a toothed wheel rigidly connected to said sprocket wheel, article retaining members located at a discharge region for retaining rows of articles upon the conveying means, fluid pressure means for actuating said article retaining members to effect discharge displacement of a row of a plurality of articles from the conveying means, and valve means periodically actuated by said toothed wheel to operate said fluid pressure means to discharge a row of articles.

10. Apparatus according to claim 1, in which the conveyors are of the belt type, each of which is arranged so that it feeds a row of articles from a single source of said articles to a loading position and removes discharged articles from said single source of articles at a discharge position.

11. Apparatus according to claim 1, in which the conveying means comprises an endless flexible member, and a plurality of carrier bars each including at least one I section bar, said carrier bars being mounted in parallel relationship on said flexible member, adjacent carrier bars being formed and arranged to receive between them a row of articles, and including means for effecting relative opening and closing movements of said bars to permit loading and discharge of the rows of articles.

12. Apparatus according to claim 1, comprising cam means operatively associated with the conveying means, and mechanical motion transmitting means periodically operable by said cam means for actuating the means for displacing rows of articles and thereby loading the said rows upon the conveying means.

13. Apparatus according to claim 1, comprising brake means for retaining rows of articles upon the conveyors prior to their delivery to the conveying means.

14. Apparatus according to claim 1, comprising brake means for retaining rows of articles upon the conveyors prior to delivery to the conveying means of other articles, a sprocket wheel driven by the conveying means, a cam wheel rigidly connected to said sprocket wheel, and means actuated by a predetermined angular movement of said cam wheel to release the retained articles for loading upon the conveying means.

15. Apparatus according to claim 1, comprising a sprocket wheel driven by the conveying means, a cam wheel rigidly connected to said sprocket wheel, means for locating rows of articles upon the conveying means, brake means for retaining rows of articles upon the conveyors prior to delivery of other rows of articles to the conveying means, said brake means including a pivotally mounted frame engageable with a row of articles, a weighted lever operatively connected to said frame, said lever carrying a roller riding upon the surface of the cam wheel, the arrangement being such that angular motion of the cam wheel effects release of the brake means at periodic intervals determined by successive operation of the means for loading rows of articles upon the conveyor, whereby rows of articles are automatically released each time the loading means is ready to propel them upon the conveying means.

16. Apparatus according to claim 15, comprising means for adjusting the angular position of said cam wheel relative to said sprocket wheel to enable the periodic brake operations to be synchronised with the periodic loading operations.

17. In a sterilising or preserving apparatus of the class described, a conveying means formed to receive therealong spaced rows of articles containing material to be processed, a plurality of feeding means for such rows of articles, said feeding means being grouped closely together and located adjacent said conveying means, a plurality of discharge conveyor means to receive such rows of articles located at a point along said conveying means remote from said plurality of feeding means, and means for simultaneously effecting displacement of all such rows of articles, in a direction transverse to the length of each row, between each of said feeding means and said conveying means and between said conveying means and said discharge conveyor means so as to bring about the loading of said rows of articles on to, and the discharge of said rows of articles from the conveying means.

References Cited in the file of this patent

UNITED STATES PATENTS

| | | |
|---|---|---|
| 1,467,008 | Parker | Sept. 4, 1923 |
| 2,090,129 | Kimball et al. | Aug. 17, 1937 |
| 2,417,753 | Hesson | Mar. 18, 1947 |
| 2,652,138 | Jackson | Sept. 15, 1953 |
| 2,654,162 | Long et al. | Oct. 6, 1953 |
| 2,734,617 | Temple | Feb. 14, 1956 |
| 2,787,361 | Harvey et al. | Apr. 2, 1957 |
| 2,862,291 | Clark et al. | Dec. 2, 1958 |
| 2,872,057 | Wagner | Feb. 3, 1959 |
| 2,893,536 | Jones | July 7, 1959 |